UNITED STATES PATENT OFFICE.

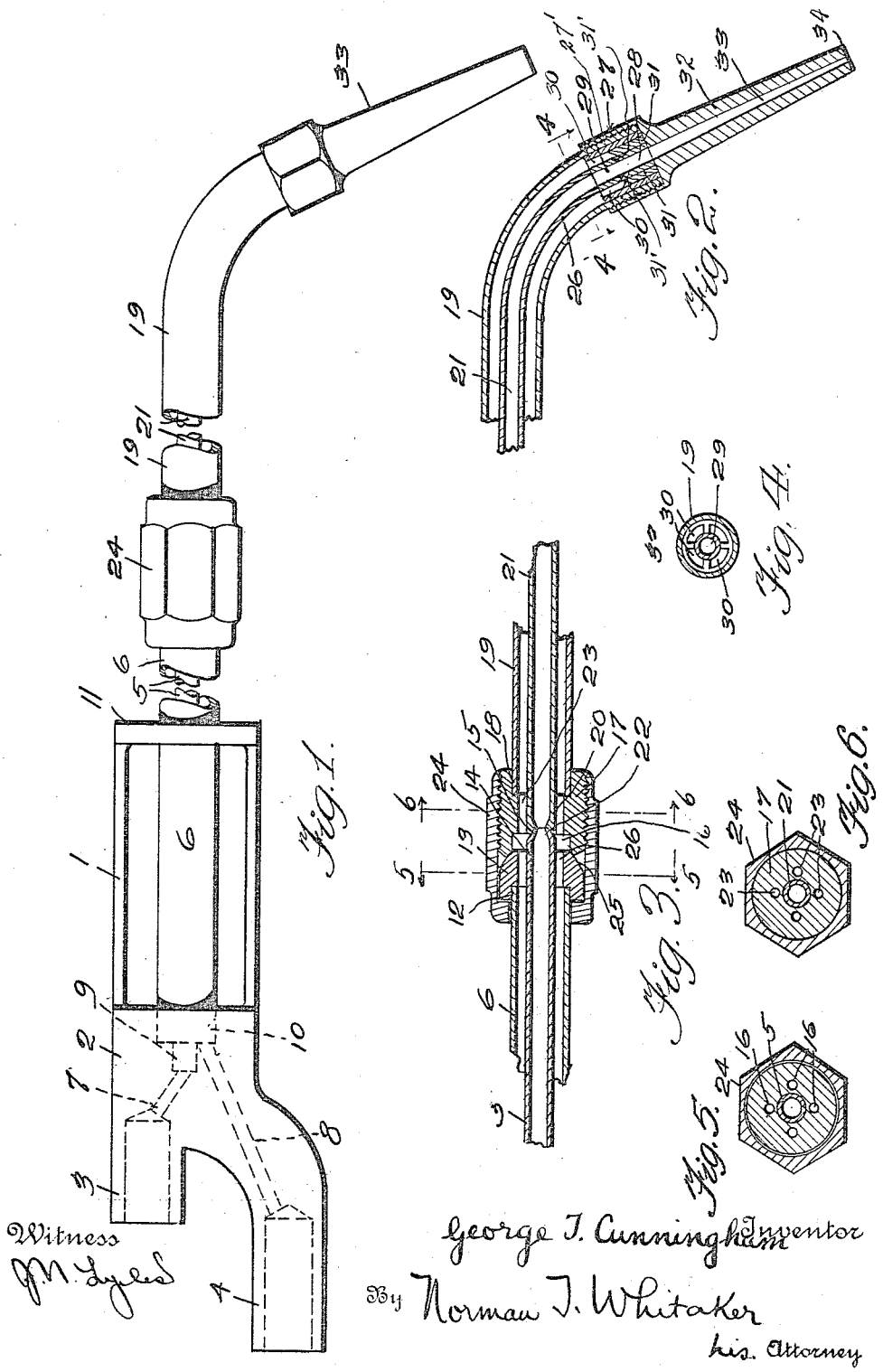

GEORGE T. CUNNINGHAM, OF SHREVEPORT, LOUISIANA.

BLOW-TORCH.

1,265,621.

Specification of Letters Patent.    Patented May 7, 1918.

Application filed June 26, 1917. Serial No. 177,120.

*To all whom it may concern:*

Be it known that I, GEORGE T. CUNNINGHAM, a citizen of the United States, and resident of Shreveport, in the parish of Caddo and State of Louisiana, have invented certain new and useful Improvements in Blow-Torches, of which the following is a specification.

This invention relates to blow torches and has particular reference to the class of blow torches in which acetylene is used as a fuel after having been mixed with oxygen, the mixing of the oxygen with the acetylene being accomplished within the torch at a point relatively near the end of the discharge nozzle.

The primary object of this invention is to provide a means for proportionately mixing oxygen with acetylene whereby a complete and perfect combustion will be afforded, thereby utilizing to the highest possible degree the latent energy stored up within the fuel designed to be used in this connection, the doing of which will necessarily not only result in the saving of fuel to be used, but will also render possible the doing of a greater amount of work in the using of a lesser amount of energy than has heretofore been possible.

Another object of the invention is to provide a device for the mixing of oxygen with acetylene to be used as a fuel, in a blow torch, whereby the danger of what is commonly known as "back firing" will be eliminated to the highest possible degree.

A further object of my invention is to provide a novel and efficient means of connecting concentric pipes, designed to carry oxygen and acetylene from a source of supply at one end to a mixing device provided at the other end of the said pipes, whereby the concentric pipes on either side of the connection may be rotatably moved with respect to the concentric pipes on the other side of the said connection.

With the foregoing and other objects in view, which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings,

Figure 1 is a side elevation of a torch showing a portion of the concentric pipes broken away on each side of the means for connecting the concentric pipes.

Fig. 2 is a longitudinal sectional view of a portion of the concentric pipes, a mixing device, and a nozzle carried at the ends of the said concentric pipes.

Fig. 3 is a longitudinal sectional view of a connecting means showing the ends of concentric pipes in communication.

Fig. 4 is a cross sectional view of Fig. 2 taken on the line 4—4.

Fig. 5 is a cross sectional view taken on the line 5—5 of Fig. 3, and

Fig. 6 is a cross sectional view taken on the line 6—6 of Fig. 3.

Referring more specifically to the drawings, 1 indicates a handle having a portion 2 made integral therewith which is provided with extended nipples 3, 4, each of which is designed to connect respectively with sources of supply of acetylene and oxygen by any suitable and desired means. The interior of the nipples 3, 4 are connected with concentric pipes 5 and 6, respectively, by means of passage-ways 7 and 8, respectively, formed within the solid portion 2 of the handle 1 and indicated by the dotted lines in Fig. 1. The concentric pipes 5 and 6 are supported by the handle 1, the ends 9 and 10 of the concentric pipes 5, 6, respectively, being embedded in the solid portion 2, while at an appreciable distance from the embedded ends 9 and 10 of the pipes 5, 6, the pipe 6 together with the pipe 5 carried therein, is supported by means of an end 11 of the handle 1, through which the pipe 6 together with the pipe 5 carried therein, is passed. The end 12 of the pipe 6 is provided with a male member 13 having an opening centrally located therein which is adapted to receive the end 14 of the pipe 5. The pipe 5 may be secured therein by any desired and suitable means. The end 14 of the pipe 5 extends to an appreciable distance through the male member and is provided with a beveled face 15. A plurality of by-passes 16 are maintained within the male member 13. These by-passes are equi-distantly spaced with respect to each other, and serve to afford a communication between the pipe 6 and the recess 16' formed within the inner end of the female member 17, which is disposed upon the end 18 of a pipe 19 corresponding to and serving a like purpose to that of the pipe 6 heretofore mentioned. The female member is adapted to receive the end 20 of a pipe 21 carried within the pipe 19, and is provided at the innermost end thereof with a seat 22 which is adapted to receive thereupon the face 15 carried by the projecting end of the pipe 5. Around the end 20 of the pipe 21 and extending longitudinally through the female member are equi-distantly spaced by-passes 23 which serve as a means to afford communication between the recess 16' and the external pipe 19. When it is desired to connect the pipes 6 to 19 and 5 to 21 respectively, as is shown in Fig. 3, the coupling 24 carried by the pipe 6 is screwed upon the member 17 thereby seating the face 15 of the pipe 5 into the seat 22 of the pipe 21, and at the same time the male member 13 is brought into engagement with the female member 17 whereby the face 25 carried by the male member 13 is seated into the seat 26 provided at the inner end of the female member 17. It can be readily seen that the acetylene will be permitted to flow unobstructed through the pipe 5 and into the pipe 21, while the oxygen carried within the pipe 6 will be allowed to pass from the pipe 6 through the by-passes 16 into the recesses 16' and thence through the by-passes 23 into the pipe 19. It can be readily seen that the two concentric pipes 6, 5 may be connected respectively with the concentric pipes 19, 21 in such a manner as to prevent the gases carried therein from coming into contact with each other within the coupling of the said pipes.

At the ends of the concentric pipes 19 and 21 there is provided a mixing device indicated as a whole by the numeral 27. I prefer to form this mixing device by inserting within the end of the pipe 19 a metal ring or filler 27' which is preferably welded therein, as shown, to form a solid mass. I then propose to drill longitudinally, with respect to the ends of the pipes 19 and 21, a plurality of openings 30. After the openings have been drilled a plug 31 is inserted in each of the same and held therein by any suitable means. I then propose to drill from within the passage 28 provided centrally within the filler a plurality of ducts 31' which serve to communicate the pipe 19 and the passage 28 as shown.

A detachable discharge nozzle 32 is disposed upon the end of the pipe 19 and held thereon by means of screw threads as shown. This nozzle is provided with a central longitudinal orifice 33 adapted to carry mixed gases from the mixing device 27 to the discharge end 34 of the nozzle.

The operation of the device is as follows: Acetylene and oxygen, when admitted into the pipes 21 and 19 respectively, travel through the same and into the mixing device 27 where they are brought into contact with each other, the oxygen being admitted into the passage 28 from the pipe 19 through the orifices 31' and mixed with the acetylene as it enters the passage 28 of the mixing device. It can be readily seen that by constructing a mixing device in the manner described the danger of what is commonly known as "back firing" is almost completely eliminated because of the fact that the acetylene will not burn within the mixing device beyond a point interior to that at which the oxygen is supplied.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus fully described my invention what I claim and desire to secure by Letters Patent, is:

1. A torch comprising concentric pipes, a mixing device comprising a filler secured at the ends of said pipes, said filler being provided with a central passage communicating with the interior of the inner pipe and an annular group of longitudinal openings communicating with the interior of the outer pipe, each opening of said annular group being connected with the central passage by means of a duct, a plug inserted within each opening of said annular group, said plug terminating within the opening of said group in proximity to the duct connected therewith.

2. A torch comprising concentric pipes, the inner of said pipes terminating within the outer of said pipes, a mixing device comprising a filler secured within the outer of said pipes and to the inner of said pipes, said filler being provided with a central passage communicating the interior of the inner pipe with an annular group of longitudinal openings communicating with the interior of the outer pipe, each opening of said annular group being connected with the central passage by means of a duct, and a plug inserted within each opening of said annular group, said plug terminating within the opening of said group in proximity to the duct.

GEORGE T. CUNNINGHAM.

Copies of this patent may be obtained for five cents each, by addressing the "Commissioner of Patents, Washington, D. C."